United States Patent [19]

Colanzi et al.

[11] 4,428,629
[45] Jan. 31, 1984

[54] PROTECTION AND SEAL MEMBER FOR ROLLING BEARINGS

[75] Inventors: Franco Colanzi; Angelo Vignotto, both of Turin, Italy

[73] Assignee: RIV-SKF Officine di Villar Perosa S.p.A., Turin, Italy

[21] Appl. No.: 325,193

[22] Filed: Nov. 27, 1981

[30] Foreign Application Priority Data

Dec. 2, 1980 [IT] Italy ............................. 68837 A/80

[51] Int. Cl.³ .................... F16C 33/78; F16C 33/80
[52] U.S. Cl. .......................... 308/187.2; 384/144; 384/147
[58] Field of Search ............... 308/187.2, 187.1; 384/144, 147; 277/53, 169, 206 R, 206 A, 277/212 F, 214, DIG. 4

[56] References Cited

U.S. PATENT DOCUMENTS 3,350,148 10/1967 Sanguinetti et al. ............ 277/169
3,366,428 1/1968 Smith .............................. 308/187.2
3,709,572 1/1973 Pethis ............................. 308/187.2
3,797,899 3/1974 Anderson ....................... 308/187.2

Primary Examiner—Lenard A. Footland
Attorney, Agent, or Firm—Shlesinger, Arkwright, Garvey & Fado

[57] ABSTRACT

A protection and seal member for rolling bearings, arranged to be interposed between the inner race and the outer race of the bearing in order to isolate the rolling bodies from the surrounding ambient by providing a seal between the said races. The main characteristics of the protection member consists in that it is configured like a ring and is made of an elastomeric material so as to be capable of being snap-coupled with the outer race of the bearing on which it is mounted, and exerting on the outer surface of the inner race and on the inner surface of the outer race a sealing action between the outer ambient and the cavity formed between the said outer and inner races.

8 Claims, 6 Drawing Figures

PROTECTION AND SEAL MEMBER FOR ROLLING BEARINGS

BACKGROUND OF THE INVENTION

The present invention relates to a resilient protection and seal member for rolling bearings, arranged to be interposed between the outer and the inner race of the bearings in order to provide the seal between inner cavity of the said races and the outer ambient.

It is known that for many technical applications it is necessary to have at one's disposal rolling bearings having installed therein special protection members arranged to isolate the rolling bodies and the respective races from the surrounding ambient, so as to prevent the lubricant from coming out from the bearing and to avoid penetration of external contaminants, such as water or dust, into the bearing.

A first embodiment of such protection members consists of a shield formed by a metal lamination which is interposed between the outer and the inner race of the bearing. The lamination is shaped in such a way as to be connected by light fit with the bearing outer race on which a suitable seating is formed, and is provided with a central hole whose diameter is slightly larger than the outer diameter of the inner race of the bearing. In this way, between the edge of the hole formed on the lamination and the outer surface of the inner race there is created a pre-established clearance which forms a labyrinth seal. When desiring to ensure the seal on both sides of the bearing, two laminations of the type described are used disposing one of them on each side. In this case the bearing is called a completely shielded bearing.

A second embodiment of said protection members consists in a sealing assembly comprising a metal ring of suitable shape such as to be connected by light fit with a special seating formed on the outer race of the rolling bearing and a resilient annular lip, made of an elastomeric material, connected in any suitable manner with the said ring and arranged to provide a sliding seal with a special surface formed on the inner race of the bearing. A protection on both sides of the said bearing is obtained by using two seal assemblies of the type described hereinabove, one on each side. In this case the bearing is called a completely sealed bearing.

The embodiments described hereinabove have numerous disadvantages, as regards both the installation and the operation.

In particular, the assembly system by shrinking between the seating formed on the outer race of the bearing and the lamination or the metal ring gives rise to a deformation of these latter and renders impossible an eventual disassembly of the protection member. This renders difficult or impossible both the substitution of the lubricant within the bearing after a certain time of operation and the periodical maintenance. In fact, in case of using a metal shield it is, of course, impossible to introduce a new lubricant without breaking the shield, whilst in case of using the sealing assembly described hereinabove it is possible to perforate the annular lip by means of a needle and add lubricant by means of a syringe; this method however is inconvenient and allows adding only small quantities of lubricant. Thus, the completely shielded bearings or the completely sealed bearings have to be designed for a duration of operation equal to that of the reserve of lubricant contained therein, and since this reserve is limited and not renewable, these bearings have short durations.

The shielded bearings have another serious disadvantage. For the sealing action to be efficient, the clearance between the edge of the hole of the metal lamination and the outer surface of the inner race must be as small as possible. However, if it is very small, because of the working tolerances an interference may take place between the lamination and the inner race if the maximum diameter of this latter (rated diameter of the race plus maximum error above the tolerance) results in being larger than the minimum diameter of the hole of the lamination (rated diameter of the hole less maximum error below the tolerance). In case of interference, since the lamination is made of a metal material, a sliding with the inner race of the bearing takes place, with consequent serious damages and loss of efficiency not only of the seal, but also of the bearing. To ensure avoiding this possibility of interference, one may choose larger clearances. However, in this case, when the hole has a diameter larger than the rated diameter and the race has an outer diameter smaller than the rated diameter (which is a case opposed to the former), the clearance results in being so large as to considerably reduce or even completely eliminate the sealing action.

The sealed bearings, instead, if they have efficient seals, they are subject to high kinematic losses because of the friction between the sliding lip and the inner race. In bearings intended to be used in applications requiring a very low friction, these losses result in being inacceptable.

SUMMARY OF THE INVENTION

It is an object of the present invention to provide a member of protection and efficient seal between the outer race and the inner race of a rolling bearing, which member will be free from the disadvantages described hereinabove. In particular, it is an object of the present invention to provide a member which will exhibit both an efficiency similar or little inferior to that which is obtainable in sealed bearings and very low or no friction at all. It is another object of the present invention to provide a member as mentioned above, which will be arranged to be easily and quickly assembled on and disassembled from the races of the bearing.

Further objects and advantages of the present invention will be apparent from the following description.

According to the present invention there is provided a protection member for rolling bearings, arranged to be interposed between the outer and the inner race of the bearing in order to isolate from the outer ambient the cavity situated between the said races, the outer race being provided with an annular seating arranged to accommodate the peripherally outer portion of the said member, characterized in being configured like a ring and made of a resilient and deformable material, the inner edge of the said member being arranged to cooperate with the outer surface of the said inner race in order to provide a seal between the said cavity and the outer ambient, and the outer edge of the said member being provided with at least two annular lips arranged to provide a snap-coupling with an annular groove formed in the said seating in order to prevent the said member from being displaced axially relative to the outer race and provide a seal between the said cavity and the outer ambient.

BRIEF DESCRIPTION OF THE DRAWINGS

For a better understanding of the present invention particular embodiments thereof will now be described in detail by way of non limiting examples with reference to the accompanying drawings, in which.

DETAILED DESCRIPTION OF THE INVENTION

Figure 1:
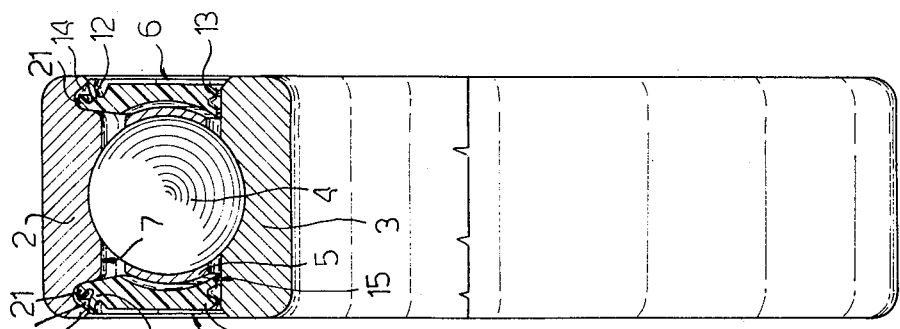
FIG. 1 is an axial section of a rolling bearing with a single circle of balls, in which there is mounted the protection and seal member according to the present invention.

Referring now to FIG. 1, reference numeral 1 indicates a rolling bearing with a single circle of balls, comprising an outer race 2, an inner race 3, a circle of balls 4 and a spacing cage 5.

Mounted between the inner race 3 and the outer race 2 are two protection and seal members, one for each side of the bearing 1.

Figure 3:
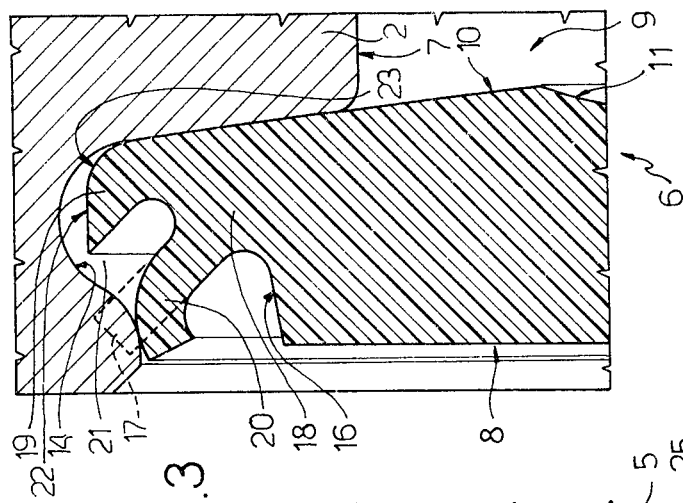
FIG. 3 is a considerably enlarged view showing the detail of the coupling between the protection and seal member of FIG. 2 and the outer race of the bearing of FIG. 1.

Member 6 (FIGS. 2, 3 and 4) is substantially ring-shaped and is made of a soft and resilient material, such as an elastomeric material, rubber or plastic resin.

Member 6 is substantially flat and has a first face 8 perpendicular to the axis of the said race and a second face 9 which is substantially parallel to the said face 8 and has a first inclined annular surface 10 extending away from the face 8 and a second annular concave surface 11. The said member has an outer edge 12, configured in such a way as to mate with a seating 14 formed on an inner surface 7 of the outer race 2 and provided with an annular projection 17 and an annular groove 21, and an inner edge 13 configured in such a way as to create a seal on the surface 15 of the inner race 3 of the bearing 1.

The outer edge 12 originates from the side surface 16 of the member 6, which surface is inclined in such a manner as to extend away from the axis of the said member as it approaches the face 9, and comprises a root section 18 from which a first annular lip 19 and a second annular lip 20 originate. The annular lip 19 extends in a substantially radial direction, is delimited towards the other lip 20 by a substantially conical surface 19a and is truncated by an annular surface 22 perpendicular to the face 8 and which is jointed without solution of continuity, by means of a fillet 23, to the inclined surface 10 of the face 9. Originating from the base of the lip 19 and from the base of the root section 18 is the second annular lip 20 of substantially rectangular cross-section, which extends in a substantially radial direction following a pre-established inclination so as to result in being parallel to the surface 19a of the first lip 19. Lip 20 extends to such a length that its radial dimension is equal to that of the lip 19.

The inner edge 13 comprises a third annular lip 24, a fourth annular lip 25 and an annular cavity 26 formed between the said lips. The annular lip 25 originates directly from an inner end 27 of the ring 7 and extends towards the axis of the said ring 7 in a substantially radial direction and is delimited by a surface 28 which is configured like the surface 11.

Annular lip 24 also originates from the end 27, is perpendicular to the axis of the ring 7 and extends towards it, is delimited externally by the face 8 and has a bevel 31. Both lips 24,25 are delimited by a surface 32 parallel to the axis of the member 6.

Figure 4:
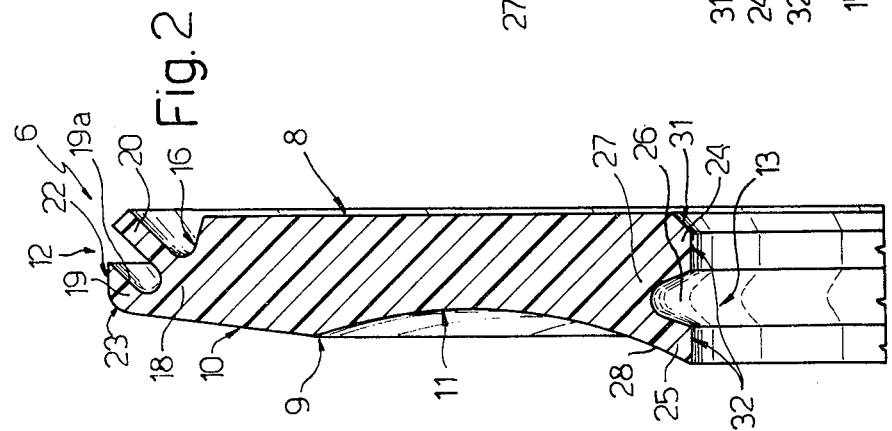
FIG. 4 is a considerably enlarged view showing the detail of the coupling between the protection and seal member of FIG. 2 and the inner race of the bearing of FIG. 1.

The length of the lips 24 and 25 in radial direction is such that when the member 6 is mounted in the bearing 1, between the end surface 32 of the said lips, and the outer surface 15 of the inner race 3 a clearance is create which has a pre-established dimension indicated by a in FIG. 4.

Figure 5:
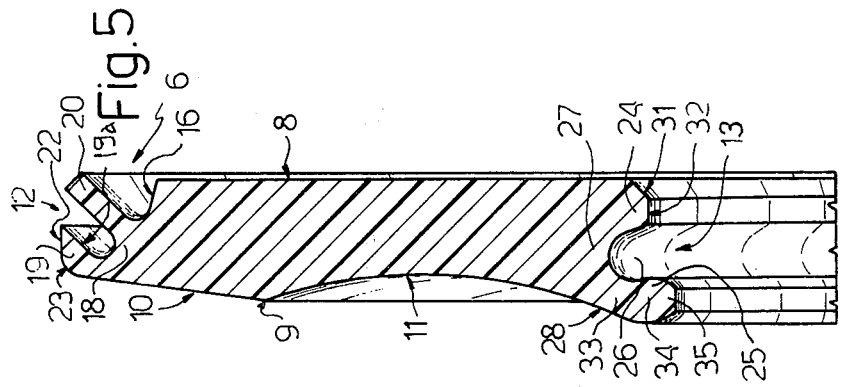
FIG. 5 is an enlarged sectional view showing the protection and seal member according to an embodiment different from that of FIG. 2.
Figure 2:
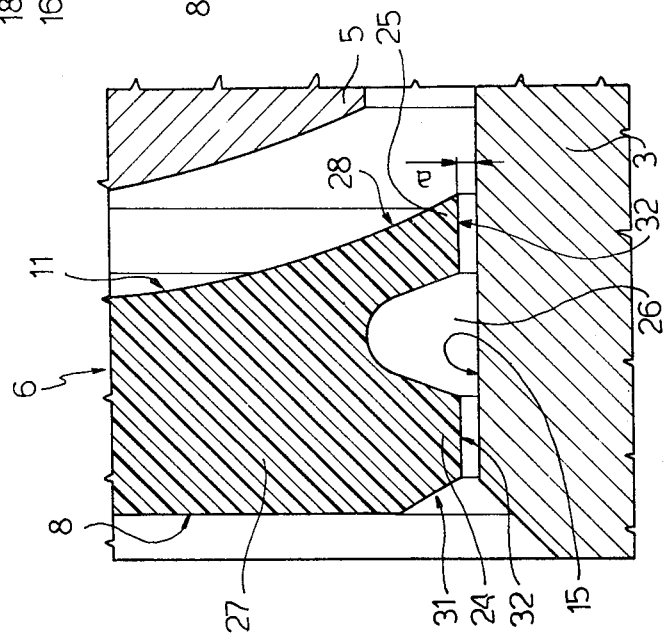
FIG. 2 is an enlarged sectional view showing the protection and seal member mounted in the bearing shown in FIG. 1.

FIG. 5 shows a member 6 according to another embodiment almost completely similar to that of FIG. 2.

The member 6 of this second embodiment is shaped substantially in the same manner as the member described hereinabove, except the edge 13; equal parts are indicated by the same reference numerals.

The inner edge 13 (FIG. 6) has an annular lip 24 perpendicular to the axis of the member 6 which projects in a radial direction and which is truncated by a surface 32 parallel to the said axis so as to leave between the said surface 32 and the surface 15 of the inner race 3, after the assembly has been accomplished, a pre-establishe clearance a; it has an annular lip 25 and a cavity 25 between the said lips 24 and 25.

Lip 25 is configured in a different way relative to the corresponding lip of the ring of FIG. 2. It extends, beginning from the end 27, in a direction substantially parallel to the lip 24 and has a first section 33 which is delimited by the surface 28 and a second section 34 perpendicular to the axis of the member 6 and terminating with an end 35 apt to slide on the surface 15 of the inner race 3. In fact, the length of the lip 25 is such that when the member 6 is being mounted in the bearing 1, an interference between the said lip 25 and the inner race 3 is created.

To carry out the assembly of the member 6 on the bearing 1 it is sufficient to rest the said race onto the mouth of the seating 14 coaxially to the axis of the bearing 1 and then exert a light pressure. In fact, since member 6 is made of soft and resilient material, lips 19 and 20 are deformed by flexion by the projection 17, thus allowing the insertion of the said member into the seating 14. As soon as the insertion is accomplished, lip 19, by resilient reaction, assumes again the initial configuration, fitting into the groove 21 of the seating 14 thereby locking the member 6 in the axial direction. Lip 20, instead, remains deformed and in contact with the annular projection 17 onto which it exerts a radial pressure proportional to its own deformation, thus exerting a sealing action in respect of both the outer contamination agents and the lubricant contained in the bearing.

To carry out an eventual disassembly of the member 6 it is sufficient to grasp it and exert a sufficient stripping force. In fact, lip 19 is intended to withstand an expulsion forxe slightly higher than the force exerted onto the member during the service. After having overcome this force, lip 19 deforms resiliently in the direction opposed to the direction of introduction and allows the extraction of the member 6, reassuming then its original configuration. In this way it is possible to disassemble the said member without breaking it.

After the assembly has been accomplished, the inner edge 13 of the member 6, as described hereinabove, is almost in contact with the surface 15 of the inner race 3, which usually is movable relative to the outer race 2. In the case shown in FIG. 4, the limited clearance a provides a first labyrinth seal between the annular lip 24 and the surface 15 and a second labyrinth seal between the annular lip 25 and the same surface 15. The annular space 26 between the lips 24 and 25 further improves the overall seal of the edge 13 in respect of both the external contamination agents and the lubricant within the bearing 1, behaving like a collection chamber in which the eventual infiltrations stop and accumulate. By filling the space 26 with grease when carrying out the assembly, the seal is further improved.

Figure 6:
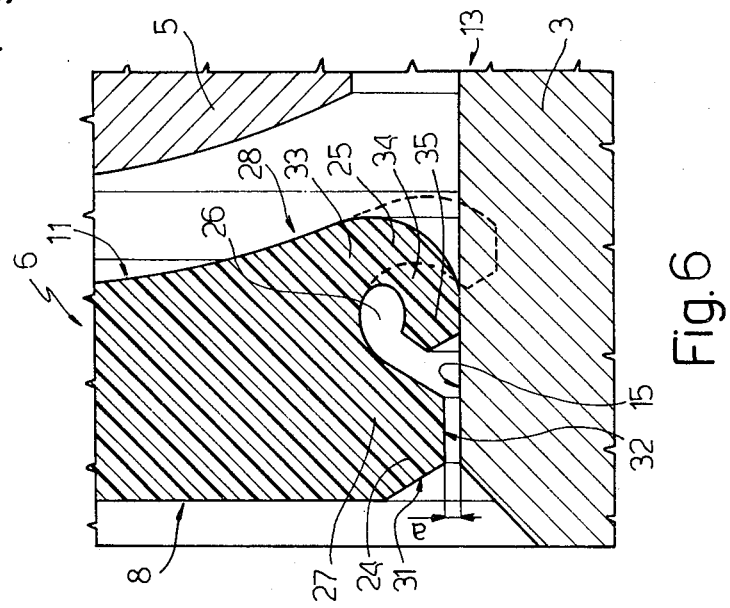
FIG. 6 is a considerably enlarged view showing the detail of the coupling of the protection and seal member of FIG. 5 with the inner race of the bearing shown in FIG. 1.

In the embodiment shown in FIG. 6, instead, the edge 13 behaves in a slightly different manner. In this case also, the limited clearance a formed between the lip 24 and the the race 3 provides a labyrinth seal improved by the presence of the collection chamber formed by the space 26, but because of the interference between the inner race 3 and the lip 25, this latter is resiliently deformed and exerts with the end 35 and onto the surface 15 a radial pressure proportional to its own deformation, thus providing a sliding seal between the races 2 and 3 of the bearing 1, which move relative to one another. In the case in which the movable element is the inner race 3, the bevel 31 and the concave surface 11 of the face 9 foster centrifugal action exerted in respect of the contamination agents and in respect of the lubricant contained within the bearing. Moreover, the concave shape of the said surface reduces the overall dimensions of the member 6 in respect of the balls 4.

From the foregoing are clearly apparent the advantages of the present invention. In particular, in the case of the embodiment shown in FIG. 2 it is possible to obtain a seal between two elements movable relative to one another, such as the races 2 and 3 of the rolling bearing 1, whose efficiency is equal or little inferior to that which is obtainable in the present sealed bearings, but free from the disadvantage of the kinetic loss by friction caused by the contact between the lips and the surface of the inner race, inasmuch as such contact does not exist. Moreover, if, because of the working tolerances, there is an interference between the lips 24,25 and the race 3, this interference produces an increase of the rolling friction between the races, but does not alterate the surfaces inasmuch as, since the said lips are made of a soft material, they deform and then wear up until the interference is eliminated. In these new conditions a clearance is obtained which is equal to zero and therefore the initial excessive friction is eliminated and a particularly efficient seal is obtained (in fact, the labyrinth seal is the more efficient, the smaller is the the clearance a, as already described hereinabove). In the case of the embodiment shown in FIG. 5, between the said races 2 and 3 of the bearing 1 a seal is obtained whose efficiency is equal or superior to that which is obtainable in the present sealed bearings, but with considerably smaller losses by friction, inasmuch as, owing to the presence of a labyrinth seal between the lip 24 and the surface 15 and of a sliding seal between the lip 25 and the same surface 15, this latter sliding seal may be obtained with smaller radial contact pressures and therefore with a smaller friction than in the case of the lips of the protection members utilized in the present sealed bearings.

Finally, in both embodiments the particular shape of the outer edge 12 allows an easy assembly and disassembly of the protection and seal member and thus allows carrying out periodical inspections and substitutions of the lubricant contained in the bearing. Furthermore, the edge 12 is arranged to couple with seatings 14 of already known and standardized type, so that it is not necessary to change the working operations carried out on the races of the bearings which are being produced at present time.

From the foregoing it is also clear that many modifications and variations may be made to embodiments of the present invention described hereinabove. In particular, protection and seal members as that shown in FIGS. 2 and 4 may be produced, in which the dimensions of the lips 24 and 25 are such as to deliberately create an interference with the surface 15 of the race 3. In this way, after an initial period of time corresponding to the period of running-in of the bearing and in which the friction is rather high, the conditions of zero clearance are achieved, which are ideal for obtaining the maximum sealing efficiency and cannot be achieved during manufacture, not even with the most restrictive tolerances.

We claim:

1. A protection member (6) for a rolling bearing (1), arranged to be interposed between the outer race (2) and the inner race (3) of the bearing in order to isolate relative to the outer ambient the cavity formed between the said races, the outer race being provided with an annular seating (14) arranged to accomodate therein the peripherally outer portion (12) of the said member (6), characterized in being configured like a ring and made of a resilient and deformable material, the inner edge (13) of the said member (6) being arranged to cooperate with the outer surface (15) of the said inner race (3) in order to provide a seal between the said cavity and and the outer ambient, and the outer edge (12) of the said member (6) being provided with at least two annular lips (19,20) arranged to provide a snap-coupling with an annular groove (21) formed in the said seating (14) in order to prevent the said member (6) from being displaced axially relative to the outer race (2) and provide a seal between the said cavity and the outer ambient; characterized in that the said outer edge (12) of the said member (6) comprises a first annular lip (19) arranged to be accomodated in the said annular groove (21) and having an outer diameter substantially equal to that of the said annular groove (21) in order to fit into it, and a second lip (20) arranged to rest with a pre-established pressure in the said seating (14) and having an outer diameter larger than that of the said seating in order to be deformed by this latter.

2. A protection member (6) for a rolling bearing as claimed in claim 1, characterized in that the said inner edge (13) is provided with one or more annular lips (24,25) whose dimensions are such as to leave between themselves and the said outer surface (15) of said inner race (3) a radial clearance of pre-established value (a) in order to provide a labyrinth seal.

3. A protection member (6) as claimed in claim 2, characterized in that at least one (25) of the said lips (24, 25) has such dimensions as to contact with a pre-established pressure the said outer surface (15) of the said inner race (3) in order to provide a sliding seal.

4. A protection member (6) as claimed in claim 1, characterized in that the said resilient and deformable material is an elastomeric material.

5. A protection member (6) for rolling bearings, as claimed in claim 1, characterized in that the said first annular lip (19) extends in a substantially radial direction, is delimited towards the said second lip (20) by a conical surface (19a) and is truncated with a cylindrical surface (22) perpendicular to a face (8) of said member (6), the said cylindrical surface (22) being jointed to the said face (8) by a fillet (23).

6. A protection member (6) for rolling bearings (1), as claimed in claim 5 characterized in that the said second annular lip (20) has a substantially rectangular cross-section and extends in a direction parallel to that of the said conical surface (19a), the said two lips (19,20) having a substantially equal diameter.

7. A protection member (6) for rolling bearings (1) as claimed in claim 1, characterized in that the said inner edge (13) of the said member (6) has a third and a fourth annular lip (24, 25) and an annular cavity (26) formed between the said third and fourth lip, which lips extend in a substantially radial direction to such an extent that a clearance of pre-established dimension (a) is created between them and the outer surface (15) of the said inner race (3).

8. A protection member (6) for rolling bearings (1) as claimed in claim 7, characterized in that one (25) of the said third and fourth annular lips (24,25) extends in a substantially radial direction to such an extent as to come into contact with the said outer surface (15) thereby being resiliently deformed so as to exert onto the said surface, by resilient reaction, a pre-established radial pressure in order to provide a seal between the said cavity and the outer ambient.

* * * * *